(12) United States Patent
Ci

(10) Patent No.: US 10,381,691 B1
(45) Date of Patent: Aug. 13, 2019

(54) MODULAR BATTERY NETWORK SYSTEMS AND METHODS FOR MANAGING MODULAR BATTERY NETWORK SYSTEMS

(71) Applicant: Nova Greentech, Inc., Omaha, NE (US)

(72) Inventor: Song Ci, Omaha, NE (US)

(73) Assignee: Nova Greentech, Inc., Omaha, NE (US)

( * ) Notice: Subject to any disclaimer, the term of this patent is extended or adjusted under 35 U.S.C. 154(b) by 545 days.

(21) Appl. No.: 14/824,753

(22) Filed: Aug. 12, 2015

Related U.S. Application Data

(63) Continuation of application No. 13/677,419, filed on Nov. 15, 2012, now Pat. No. 9,502,893.

(51) Int. Cl.
*H02J 3/32* (2006.01)
*G05B 15/02* (2006.01)
*G06F 1/26* (2006.01)
*H01M 10/42* (2006.01)

(52) U.S. Cl.
CPC .. *H01M 10/425* (2013.01); *H01M 2010/4271* (2013.01); *H01M 2220/20* (2013.01)

(58) Field of Classification Search
CPC . H01M 2010/4278; H01M 2010/4271; H01M 10/4257; H02J 7/0024
USPC .......................................................... 320/121
See application file for complete search history.

(56) References Cited

U.S. PATENT DOCUMENTS

| | | | | |
|---|---|---|---|---|
| 4,274,043 A * | 6/1981 | Heitz | ............... | H01M 10/4207 307/151 |
| 5,381,554 A | 1/1995 | Langer et al. | | |
| 5,514,916 A * | 5/1996 | Yang | ............... | H02J 7/0031 307/63 |
| 5,850,351 A | 12/1998 | Lotfy et al. | | |
| 6,104,967 A * | 8/2000 | Hagen | ............... | H02J 7/0021 429/50 |
| 6,140,799 A | 10/2000 | Thomasson | | |
| 6,430,692 B1 | 8/2002 | Kimble et al. | | |
| 6,583,522 B1 | 6/2003 | McNulty et al. | | |
| 7,898,223 B2 * | 3/2011 | Takeda | ............... | H02M 3/07 320/117 |
| 8,330,419 B2 * | 12/2012 | Kim | ............... | H01M 10/4207 320/117 |
| 8,427,106 B2 * | 4/2013 | Kim | ............... | H01M 10/4207 320/117 |
| 8,816,613 B2 * | 8/2014 | Lee | ............... | H02J 7/0024 318/140 |
| 9,502,737 B2 * | 11/2016 | Bradwell | ............... | H01M 4/38 |

(Continued)

*Primary Examiner* — Rexford N Barnie
*Assistant Examiner* — Thai H Tran
(74) *Attorney, Agent, or Firm* — Suiter Swantz pc llo

(57) ABSTRACT

A battery network is disclosed. The battery network may include a plurality of battery blades. Each battery blade may include a plurality of battery cells; a connection mechanism configured to establish an adjustable connection between the plurality of battery cells; and a processor in communication with the connection mechanism and the plurality of battery cells. The processor may be configured to control the connection mechanism at least partially based on a state of charge of at least one of the plurality of battery cells, and the processor of each battery blade of the plurality of battery blades may be further configured to communicate with each other to support operation of the battery network as an integrated electric power source.

19 Claims, 2 Drawing Sheets

(56) References Cited

U.S. PATENT DOCUMENTS

| | | | |
|---|---|---|---|
| 9,735,590 B2* | 8/2017 | Wang | H02J 7/0016 |
| 2001/0012794 A1* | 8/2001 | Nishihara | H01M 10/4207 |
| | | | 455/574 |
| 2002/0113493 A1* | 8/2002 | Morrow | H02J 7/0024 |
| | | | 307/71 |
| 2003/0071523 A1* | 4/2003 | Silverman | H01M 2/20 |
| | | | 307/150 |
| 2004/0027094 A1* | 2/2004 | Sanders | G01R 31/3606 |
| | | | 320/150 |
| 2005/0023054 A1* | 2/2005 | Weidenheimer | F41B 6/00 |
| | | | 180/65.25 |
| 2005/0038614 A1* | 2/2005 | Botts | G01R 31/3606 |
| | | | 702/63 |
| 2005/0052154 A1* | 3/2005 | Kavounas | H02J 7/0024 |
| | | | 320/116 |
| 2005/0071092 A1 | 3/2005 | Farkas et al. | |
| 2005/0146223 A1 | 7/2005 | Kanouda et al. | |
| 2007/0062744 A1* | 3/2007 | Weidenheimer | F41B 6/00 |
| | | | 307/71 |
| 2007/0114852 A1 | 5/2007 | Lin et al. | |
| 2007/0276547 A1 | 11/2007 | Miller | |
| 2007/0279953 A1* | 12/2007 | Hoff | H01M 2/105 |
| | | | 363/87 |
| 2008/0180061 A1* | 7/2008 | Koski | H01M 10/441 |
| | | | 320/117 |
| 2009/0036943 A1* | 2/2009 | Signoff | A61N 1/378 |
| | | | 607/36 |
| 2009/0050591 A1 | 2/2009 | Hart et al. | |
| 2009/0085553 A1* | 4/2009 | Kumar | H01M 10/425 |
| | | | 323/351 |
| 2010/0013314 A1 | 1/2010 | Groff et al. | |
| 2010/0261043 A1* | 10/2010 | Kim | H01M 10/4207 |
| | | | 429/61 |
| 2010/0261048 A1* | 10/2010 | Kim | H01M 10/44 |
| | | | 429/150 |
| 2010/0314950 A1 | 12/2010 | Rutkowski et al. | |
| 2011/0001442 A1* | 1/2011 | Lee | B62M 6/45 |
| | | | 318/139 |
| 2011/0046835 A1 | 2/2011 | Taguchi | |
| 2011/0053656 A1* | 3/2011 | Plestid | H01M 10/42 |
| | | | 455/574 |
| 2011/0130721 A1* | 6/2011 | Foster | B81C 1/0023 |
| | | | 604/151 |
| 2011/0181245 A1* | 7/2011 | Wey | H02J 7/0016 |
| | | | 320/118 |
| 2011/0208453 A1 | 8/2011 | Ci et al. | |
| 2011/0304211 A1 | 12/2011 | Peterson et al. | |
| 2012/0029720 A1 | 2/2012 | Cherian et al. | |
| 2012/0114996 A1 | 5/2012 | Yu et al. | |
| 2012/0256568 A1* | 10/2012 | Lee | H02J 7/0024 |
| | | | 318/139 |
| 2012/0319493 A1* | 12/2012 | Kim | H01M 10/4207 |
| | | | 307/80 |
| 2013/0002016 A1* | 1/2013 | Furukawa | H01M 10/425 |
| | | | 307/9.1 |
| 2013/0196205 A1* | 8/2013 | Silk | H01M 2/0245 |
| | | | 429/99 |
| 2013/0320772 A1* | 12/2013 | Qiao | H01M 10/04 |
| | | | 307/87 |
| 2014/0312828 A1* | 10/2014 | Vo | H01M 10/4257 |
| | | | 320/103 |
| 2015/0130421 A1* | 5/2015 | Bevilacqua, III | H02J 7/0016 |
| | | | 320/122 |
| 2015/0137741 A1* | 5/2015 | Gurries | H02J 7/0073 |
| | | | 320/107 |
| 2016/0036252 A1* | 2/2016 | Peterswerth | H02J 7/0021 |
| | | | 320/118 |

* cited by examiner

MODULAR BATTERY NETWORK SYSTEMS AND METHODS FOR MANAGING MODULAR BATTERY NETWORK SYSTEMS

TECHNICAL FIELD

The present invention relates to the field of power supply and particularly to a system and method for providing battery based power supplies.

BACKGROUND

Batteries are essential for operations of data centers, server farms, electrical vehicles and the like. A conventional battery typically includes multiple battery cells wired in a manner that satisfies certain requirements. Conventional batteries, however, are not dynamically adjustable and are not designed to handle rapidly changing operating environment.

SUMMARY

Accordingly, an embodiment of the present disclosure is directed to a battery network. The battery network may include a plurality of battery blades. Each battery blade may include a plurality of battery cells; a connection mechanism configured to establish an adjustable connection between the plurality of battery cells; and a processor in communication with the connection mechanism and the plurality of battery cells. The processor may be configured to control the connection mechanism at least partially based on a state of charge of at least one of the plurality of battery cells, and the processor of each battery blade of the plurality of battery blades may be further configured to communicate with each other to support operation of the battery network as an integrated electric power source.

An additional embodiment of the present disclosure is directed to a battery. The battery may include a plurality of battery cells; a connection mechanism configured to establish an adjustable connection between the plurality of battery cells; and a processor in communication with the connection mechanism and the plurality of battery cells. The processor may be configured to: control the connection mechanism at least partially based on a state of charge of at least one of the plurality of battery cells and communicate with at least one other processor of at least one other battery to form a battery network that operates as an integrated electric power source.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
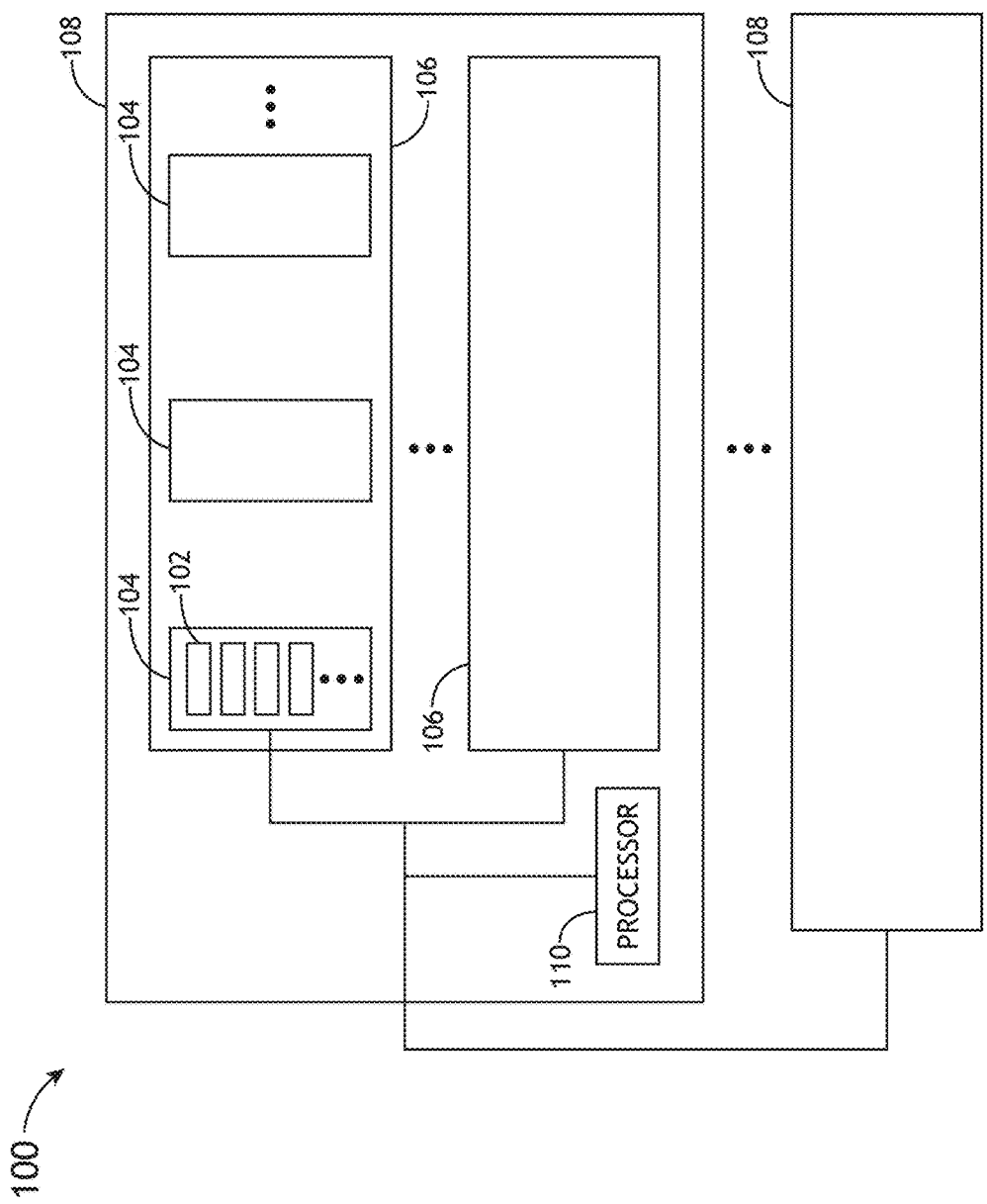
FIG. 1 is a block diagram depicting an exemplary modular battery network system in accordance with the present disclosure.

The present disclosure is directed to modular battery network systems and methods for managing such modular battery network systems. FIG. 1 is a block diagram illustrating an exemplary modular battery network system 100 in accordance with the present disclosure.

Figure 2:
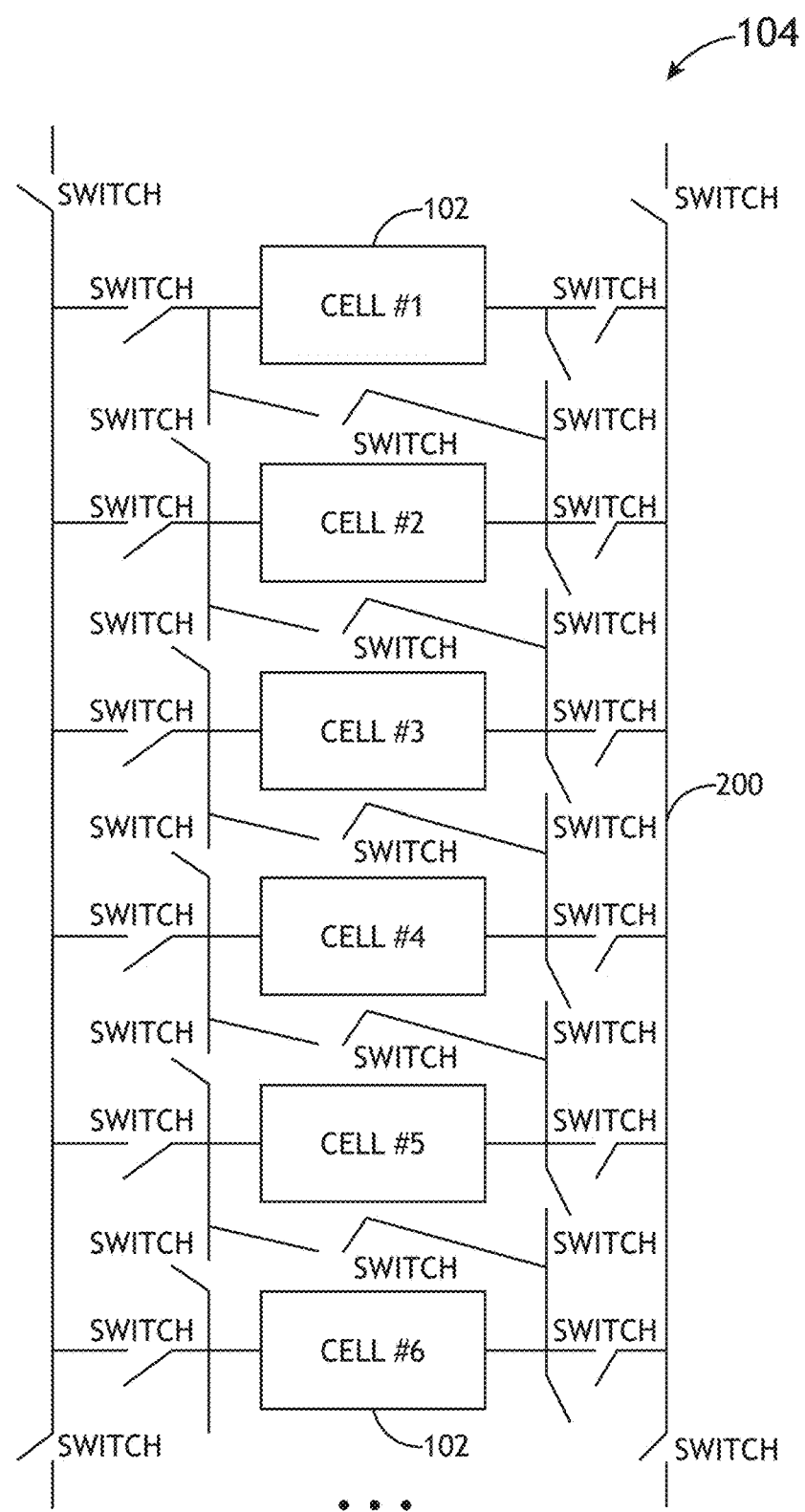
FIG. 2 is a block diagram depicting an exemplary connection mechanism that may be utilized in the exemplary modular battery network system shown in FIG. 1.

As shown in FIG. 1, the fundamental building blocks of the modular battery network system 100 are the battery cells 102. Similar to the battery cells used in conventional batteries, each battery cell 102 may include a device capable of either generating electrical energy from chemical reactions or facilitating chemical reactions through the introduction of electrical energy, and a plurality of such battery cells 102 may form a cell group 104. Different from conventional batteries, however, each cell group 104 in the modular battery network system 100 may be arranged in a dynamically adjustable manner as shown in FIG. 2. More specifically, a connection mechanism 200 utilizing a plurality of switches as depicted in FIG. 2 may allow the connections among the battery cells 102 to be adjustable to meet a given output requirement.

Referring back to FIG. 1, a plurality of cell groups 104 may form a unit referred to as a battery "brick" 106, and a plurality of battery bricks 106 in turn may form a unit referred to as a battery "blade" 108. For the purposes of presentation simplicity, detailed wiring structures within each battery brick 106 and within each battery blade 108 are not shown. It is to be understood, however, that similar wiring structures depicted in FIG. 2 may be applicable to the battery bricks 106 and/or the battery blade 108. For instance, a plurality of cell groups 104 within a battery brick 106 may be arranged in a dynamically adjustable manner similar to the arrangement of the battery cells 102 within a cell group 104, and a plurality of battery bricks 106 within a battery blade 108 may also be arranged in a dynamically adjustable manner similar to the arrangement of the battery cells 102 within a cell group 104.

It is contemplated that the battery unit included in each power storage unit may include one or more individual batteries arranged in series, parallel, or combination of series and parallel. The individual batteries may also be arranged in a dynamically adjustable manner as shown in FIG. 2. The various switches depicted in FIG. 2 allow the connection among the individual batteries to be adjustable to meet the output requirement. It is also contemplated that each individual battery may include one or more battery cells arranged in a series, a parallel, or an adjustable manner without departing from the spirit and scope of the present disclosure.

The battery blade 108 may also include one or more processors 110 configured to control the wiring within the battery blade 108. For instance, the one or more processors 110 may be able to estimate the state of charge (SOC) and/or the state of health (SOH) of each battery cell 102, cell group 104, battery brick 106 and/or the battery blade 108, detect malfunctions/defects, and determine whether any adjustment is needed with regards to the established connections among the various battery cells 102 within the battery blade 108. It is contemplated that the one or more processors 110 may choose to adjust the connections at the group level 104, the brick level 106, the blade level 108, or a combination of the various adjustable levels.

It is contemplated that various techniques may be utilized to help estimate the SOCs and/or SOHs. For instance, the process disclosed in U.S. patent application Ser. No. 13/033,519 filed on Feb. 23, 2011 and entitled "Circuit Based Method for Estimating Battery Capacity", which is incorporated herein by reference, may be utilized in certain implementations. Once the SOCs are estimated, the one or more processors 110 may determine whether the established connections among the various battery cells 102 within the battery blade 108 are able to deliver a satisfactory output based on the estimated SOCs. For example, if it is determined that the output provided by the battery blade 108 is more than sufficient to satisfy a given requirement, the one or more processors 110 may consider reconfiguring the established connections in an effort to put some battery cells 102 into "rest", which may improve their overall output capacities. On the other hand, if it is determined that the output provided by the battery blade 108 is insufficient to satisfy a given requirement, the one or more processors 110 may consider reconfiguring the established connections to increase the output back to the satisfactory level (e.g., by increasing the number of participating battery cells 102 accordingly).

It is also contemplated that the one or more processors 110 may help optimize charging as well. For example, if it is determined that SOCs of certain battery cells 102 are critically low, the one or more processors 110 may decide to charge these battery cells 102 first. On the other hand, if it is determined that certain battery cells 102 still hold sufficient charge, the one or more processors 110 may decide to bypass these battery cells 102 during charging.

It is noted that a battery blade 108 implemented in accordance with the present disclosure may therefore be considered as a self-configurable power source. It is also noted that a plurality of such battery blades 108 may be interconnected to form a battery network. This battery network may be jointly referred to as the modular battery network system 100, which may provide several advantages over conventional battery systems.

More specifically, the self-configurable nature of the battery blades 108 allows them to form an integrated network that can be easily managed. The one or more processors 110 located on each battery blade 108 within the network 100 may be able to communicate with each other, allowing the battery blades 108 to seamlessly operate with each other in a manner similar to computers participating in a distributed computing system. That is, similar to the way each computer may contribute processing power to an overall system (as in the case of a distributed computing system), each battery blade 108 may contribute electrical power to the battery network 100. Additionally, similar to the way a distributed computing system may allow a computer to join or leave the distributed computing system, the battery network 100 may also allow a battery blade 108 to do so accordingly, effectively making the battery blades 108 hot-pluggable or hot-swappable.

It is contemplated that a battery network 100 configured in accordance with the present disclosure may be utilized as a power source for various types of devices, including data centers, server farms, electrical vehicles and the like. It is also contemplated that the battery cells 102, groups 104, bricks 106, and blades 108 included in a battery network 100 are not required to be uniform. While a uniform configuration may provide interchangeable parts and lower system maintenance costs, different configurations may nonetheless be supported without departing from the spirit and scope of the present disclosure.

Furthermore, it is contemplated that a battery network 100 configured in accordance with the present disclosure may also allow battery blades 108 located at different locations to jointly function together, as long as the battery blades 108 are electrically connected and their respective processors 110 can communicate with each other (through wired or wireless data communication means). This ability may allow various battery networks to be setup at local, regional, national, or even international levels, providing battery-based power solutions to satisfy various consumer demands. It is contemplated that distributed power management techniques, such as those disclosed in U.S. patent application Ser. No. 13/677,419 filed on Nov. 15, 2012 and entitled "Distributed Power Supply System and Method", which is incorporated herein by reference, may be utilized to manage the battery network 100 without departing from the spirit and scope of the present disclosure.

Each cell group 104 may include a management unit that monitors the SOC C and the load L of that particular cell group 104 in real-time and provides such information to the processor 110. Let $C_i$ and $L_i$ denote the SOC and the load of the cell group 104 on rack i. The processor 110, upon receiving such information, makes the following determination:

1) If $C_i-L_i \geq C_{threshold}$, the cell group 104 in rack i is considered sufficient to power the corresponding server in rack i; and
2) If $C_i-L_i < C_{threshold}$, the cell group 104 in rack i is considered insufficient to power the corresponding server in rack i, with only $C_i-C_{threshold}$ available locally, and needs a supplemental power of $\Delta L_i = L_i - C_i + C_{threshold}$;

Wherein $C_{threshold}$ denotes the lower threshold that the cell group 104 can still release power.

With this information, the processor 110 can compile a set of server racks, denoted as $\Psi$, determined to have insufficient local power supply, i.e., $C_i-L_i < C_{threshold}$. Let $\Theta$ denote the set of all server racks, $\Theta-\Psi$ therefore denotes the set of servers with sufficient local power supply. The cell group 104 in rack j, $j \in (\Theta-\Psi)$ therefore needs to provide power not only to its corresponding local server, but also to the servers in $\Psi$. Now let $x_j$ denote the amount of power that the cell group 104 in rack j needs to provide to servers in $\Psi$, the value of $x_j$ can be determined utilizing an optimization function defined as follows:

Minimize:

$$\sum_{j \in (\Theta-\Psi)} \frac{x_j}{C_i - L_i - C_{threshold}}$$

Subject to:

$$\sum_{j \in (\Theta-\Psi)} x = \sum_{i \in \Psi} \Delta L_i$$

$$x_j \geq 0, \forall j \in (\Theta-\Psi)$$

It is contemplated that the processor 110 may utilize various techniques/algorithms to solve the optimization function defined above to obtain the value of $x_j$, $j \in (\Theta-\Psi)$. The processor 110 may then provide the $x_j$ value to each rack $j \in (\Theta-\Psi)$. Upon receiving the $x_j$ value, the cell group 104 in rack j may then release the amount of power required to power its corresponding local server in rack j plus an additional $x_j$ to the DC power supply unit in rack j. The DC power supply unit in rack j then provides the sufficient power to the local server in rack j, and also provides the additional $x_j$ to the DC bus that connects all DC power supply units in the modular battery network system 100. The DC power supply units for the servers in Ψ, i.e., the servers that determined to have insufficient local power supply, may then draw the power from the DC bus to continue their operations.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A battery network, comprising:
   a plurality of battery blades, each comprising:
      a plurality of cell groups, wherein each cell group of the plurality of cell groups includes a plurality of battery cells and a connection mechanism configured to establish an adjustable connection between the plurality of battery cells in a cell group; and
      a processor in communication with the plurality of cell groups, the processor configured to control each connection mechanism at least partially based on a state of charge of at least one of the plurality of battery cells in each of the plurality of cell groups,
   wherein the processor is further configured to optimize output power of each of the plurality of cell groups based on state of charge (SOC) C and load L of each of the plurality of cell group i by determining whether cell group i have sufficient SOC based on $C_i - L_i \geq C_{threshold}$ and calculating a supplemental power $\Delta L_i = L_i - C_i + C_{threshold}$ when cell group i have insufficient SOC, wherein the processor is further configured to determine an optimal solution for an optimization function defined as:
   Minimize:
   $$\sum_{j \in (\Theta - \Psi)} \frac{x_j}{C_i - L_i - C_{threshold}}$$
   Subject to:
   $$\sum_{j \in (\Theta - \Psi)} x = \sum_{i \in \Psi} \Delta L_i$$
   $$x_j \geq 0, \forall j \in (\Theta - \Psi)$$
   wherein Θ denotes the set of all cell groups, Ψ denotes the set of cell groups that have insufficient SOC, and x denotes supplemental output power needed from cell group j.

2. The battery network of claim 1, wherein the plurality of cell groups forms a plurality of battery bricks.

3. The battery network of claim 2, wherein the processor is configured to estimate the state of charge of at least one of the plurality of battery cells, the plurality of cells groups or the plurality of battery bricks.

4. The battery network of claim 3, wherein the processor is configured to control the connection mechanism based on the estimated state of charge of at least one of the plurality of battery cells, the plurality of cells groups, or the plurality of battery bricks.

5. The battery network of claim 4, wherein the processor is configured to control the connection mechanism to bypass one or more of the plurality of batteries when an output provided by a battery blade is more than sufficient to satisfy a given requirement.

6. The battery network of claim 4, wherein the processor is configured to control the connection mechanism to reconfigure one or more battery connections to satisfy a given requirement.

7. The battery network of claim 6, wherein the processor is configured to control the connection mechanism to increase the number of participating battery cells to satisfy a given requirement.

8. The battery network of claim 4, wherein the processor of each battery blade of the plurality of battery blades is further configured to communicate with the processor of each battery blade wirelessly.

9. The battery network of claim 1, wherein the battery blades are co-located.

10. The battery network of claim 1, wherein the battery blades are distributed.

11. A battery, comprising:
    a plurality of battery cells;
    a connection mechanism configured to establish an adjustable connection between the plurality of battery cells; and
    a processor in communication with the connection mechanism and the plurality of battery cells, the processor configured to control the connection mechanism at least partially based on a state of charge of at least one of the plurality of battery cells, and the processor further configured to communicate with at least one other processor of at least one other battery to form a battery network that operates as an integrated electric power source,
    wherein the processor is further configured to optimize output power of the battery and the at least one other battery based on state of charge (SOC) C and load L of each of the battery i by determining whether battery i have sufficient SOC based on $C_i - L_i \geq C_{threshold}$ and calculating a supplemental power $\Delta L_i = L_i - C_i + C_{threshold}$ when battery i have insufficient SOC, wherein the processor is further configured to determine an optimal solution for an optimization function defined as:
    Minimize:
    $$\sum_{j \in (\Theta - \Psi)} \frac{x_j}{C_i - L_i - C_{threshold}}$$
    Subject to:
    $$\sum_{j \in (\Theta - \Psi)} x = \sum_{i \in \Psi} \Delta L_i$$
    $$x_j \geq 0, \forall j \in (\Theta - \Psi)$$
    wherein Θ denotes the set of all batteries, Ψ denotes the set of batteries that have insufficient SOC, and x denotes supplemental output power needed from battery j.

12. The battery of claim 11, wherein the plurality of battery cells forms a plurality of cell groups.

13. The battery of claim 12, wherein the plurality of cell groups forms a plurality of battery bricks.

14. The battery of claim 13, wherein the processor is configured to estimate the state of charge of at least one of the plurality of battery cells, the plurality of cells groups or the plurality of battery bricks.

15. The battery of claim 14, wherein the processor is configured to control the connection mechanism based on the estimated state of charge of at least one of the plurality of battery cells, the plurality of cells groups, or the plurality of battery bricks.

16. The battery of claim 15, wherein the processor is configured to control the connection mechanism to charge one or more of the plurality of battery cells containing a critically low charge first.

17. The battery of claim 11, wherein the battery and said at least one other battery are co-located.

18. The battery of claim 11, wherein the battery and said at least one other battery are distributed.

19. The battery of claim 11, wherein the plurality of battery cells are not uniform.

\* \* \* \* \*